May 29, 1951 L. SCHLENTZ 2,555,249
SOIL ROLLER
Filed June 25, 1946
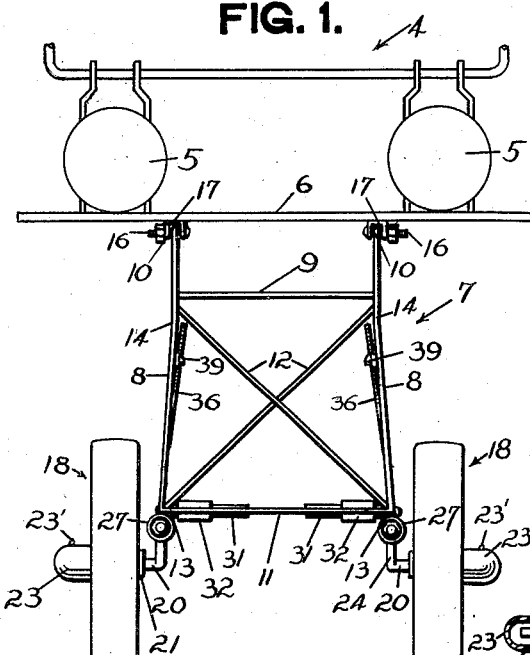
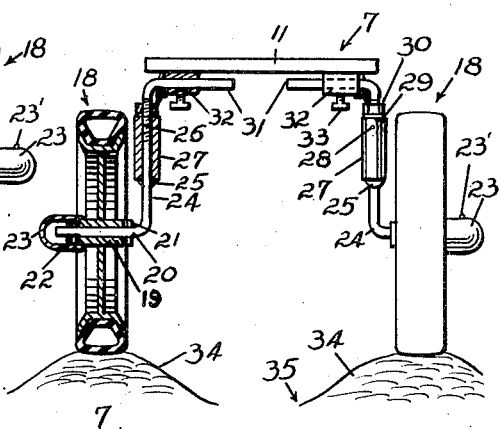
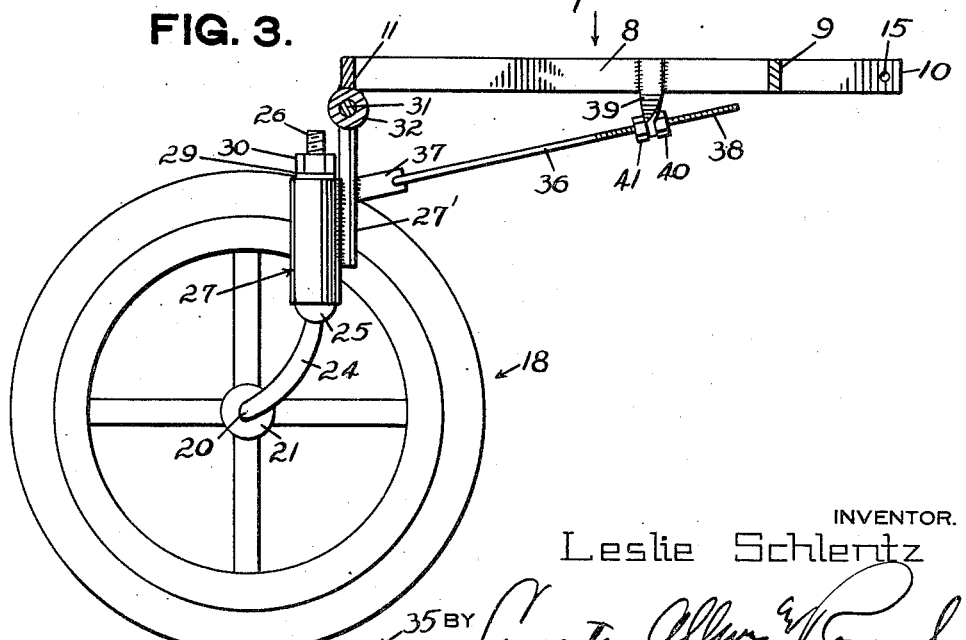
INVENTOR.
Leslie Schlentz
BY
ATTORNEYS.

Patented May 29, 1951

2,555,249

UNITED STATES PATENT OFFICE 2,555,249

SOIL ROLLER

Leslie Schlentz, Hondo, Tex.

Application June 25, 1946, Serial No. 679,061

2 Claims. (Cl. 97—56)

This invention relates to improvements in soil rollers, particularly of the type adapted to be attached to and drawn by a seed planter to pack the soil upon and around the seeds deposited in rows by the planter for the purpose of keeping moisture in the ground and protecting the newly planted seeds from insects, and the primary object of this invention is to provide a device of this character which is more practical and efficient in operation and substantially simpler and less expensive in construction.

Another important object of this invention is to provide an improved device of the character indicated above which is readily adjustable to operate with planters of different heights and to accommodate rows of different widths.

Other important objects and advantages of this invention will be apparent from the following detailed description and drawings appended thereto, wherein for purposes of illustration a nonlimitative embodiment of the invention is set forth.

In the drawings:

Figure 1 is a top plan view showing the device attached to be drawn by a seed planter.

Figure 2 is a rear elevation of said device partly in section to show details of construction.

Figure 3 is a vertical longitudinal section on an enlarged scale, showing one of the wheels and its adjustable mountings.

Referring to the drawings in detail, the numeral 4 generally designates any conventional type of seed planter having the laterally spaced seed planting elements 5 and the rearwardly placed transverse horizontal bar 6, to which the device of the present invention is detachably connectible.

The soil roller 7, embodying the present invention, comprises a generally horizontal frame consisting of two similar longitudinal flat side bars 8, a front transverse cross bar 9 secured therebetween rearwardly of the forward ends 10 of the side bars, a rear cross bar 11 secured to the rear ends of said side bars, and a pair of crossed diagonally arranged brace bars 12 connected at their forward ends to said side bars 8 near the front cross bar 9 and at their rear ends to the corners 13 formed by the connection of the rear transverse bar 11 to the rear ends of the side bars 8. As indicated in Figure 1, the side bars 8 flare rearwardly from points 14 located immediately to the rear of the forward ends of the crossed diagonal brace bars 12.

The front ends 10 of the side bars 8 have holes 15 passing pivot bolts 16 carried by U-shaped draft brackets 17 mounted on the rear side of the planter bar 6, whereby the soil roller 7 can be quickly and securely connected and disconnected from the planter, and when connected be free to pivot upwardly and downwardly relative to the planter 4 on the bolts 16.

The soil roller frame is supported at the rear end by tire equipped wheels 18 having tubular hubs 19 receiving axles 20 having wheel collars 21 at the inner sides of the wheels and cotter keys or the like 22 holding the wheels on the axles, with hub caps 23 enclosing the outer ends of the axles and removably secured to the wheel hubs, which are equipped with grease fittings 23'.

The said axles 20 are in the form of horizontal laterally extending portions on the rearwardly curved lower ends of vertical shafts or rods 24 which have stop collars 25 below their upper threaded end portions 26, which extend rotatably and vertically slidably in vertical sleeves 27 which have grease fittings 28. The stop collars 25 bear against the lower ends of the sleeves 27 while washers 29 and nuts 30 provided on the threaded portions 26 bear freely upon the tops of the sleeves 27 so that the wheels 18 swivel in said sleeves as the device is drawn over the ground.

The sleeves 27 are welded to the rear of depending vertical rods 27' on whose upper ends are laterally inwardly directed horizontal shafts 31 which are turnable and slidable in horizontal sleeves 32 which are secured to the underside of opposite ends of the rear frame cross bar 11. The sleeves 32 have set screws 33 for locking the shafts 31, after the wheels 18 have been properly spaced relative to the planted rows 34 on the ground 35 behind the seed planting elements 5 by moving the shafts 31 laterally inwardly or outwardly with respect to the frame as required, and the vertical rods 27' and hence the wheels 18, have been given the desired tilt on the axis of the shafts 31, according to th relative height of the bar 6 of the planter 4. Where the planter bar 6 is relatively high, the wheels 18 require to be adjusted rearwardly and where the planter bar 6 is relatively low, forwardly from the perpendicular, in order to prevent the wheels 18 from dragging.

This tilting adjustment of the wheels is produced and maintained by means of adjusting rods 36 which have enlarged rearward portions 37 welded to the depending portions 27' on the shafts 31, and threaded forward portions 38 passing through brackets 39 welded to the inside of forward portions of the soil roller frame side bars 8, having nuts 40 and 41 to bear against opposite sides of the bracket 39.

It is obvious that with wheels 18 properly adjusted as to tilt and spacing, the passage of the planter 4 along the rows 34 will cause the wheels 18 to roll upon the rows 34 upon which the seed from the planting elements 5 has been deposited, so as to impact and pack the soil of the rows around and upon the seed, and that this accurate following action of the wheels 18 is automatically maintained in the planting of curved rows by the castering or swivelling of the wheels.

What is claimed is:

1. The combination with a seed planter having a pair of seed planting elements and a horizontal transverse bar, of a seed row roller comprising a generally horizontal rigid frame comprising spaced longitudinal side members and cross members rigidly secured to said longitudinal members, horizontal pivots connecting the forward ends of said longitudinal members to laterally spaced points on said bar whereby said roller frame can swing up and down relative to said planter, a pair of roller ground wheels positioned laterally outwardly from the sides of said roller frame and having wide ground-engaging surfaces, caster means mounting said wheels on the rear part of said roller frame comprising laterally outwardly projecting stub axles on which the wheels are journalled, said stub axles having forward projections terminating in normally vertical rods, normally vertical sleeves through which said rods project, means securing said rods in place in said sleeves so that said rods can turn freely therein, laterally inwardly projecting rods on said sleeves, horizontal sleeves secured to the rear part of said roller frame through which said inwardly projecting rods slidably and rotatably extend, means fixing said inwardly projecting rods in selected transverse positions in said sleeves wherein said roller wheels are aligned with said seed planting elements, and wheel tilt adjusting means connected between said vertical sleeves and said roller frame for tilting said rods and first-named sleeves.

2. The combination with a seed planter having a pair of laterally spaced seed planting elements and a horizontal transverse bar, of a seed row roller comprising a rigid generally horizontal frame comprising a pair of laterally spaced longitudinal side members positioned between and having their forward ends horizontally pivoted to said bar at laterally spaced points between said seed planting elements, cross members rigidly secured to and between said longitudinal side members, seed row rolling wheels positioned laterally outwardly of said longitudinal side members, and caster means mounting said wheels on the rear part of said roller frame, said caster means comprising substantially L-shaped pivot means including laterally outwardly projecting stub axles on which said wheels are journalled and normally vertical extensions, and sleeves receiving said extensions, substantially L-shaped pivots, with one portion thereof secured to said sleeves horizontal axis pivot means on which the other portions of said last-named L-shaped pivots can turn to tilt said normally vertical extensions, and adjustable means operating between said longitudinal side members and the corresponding tilt means whereby the caster of said extensions can be tiltably adjusted and maintained in adjusted position.

LESLIE SCHLENTZ.

REFERENCES CITED

The following references are of record in the file of this patent:

UNITED STATES PATENTS

| Number | Name | Date |
| --- | --- | --- |
| 778,123 | Fetzer | Dec. 20, 1904 |
| 1,062,882 | Bruene | May 27, 1913 |
| 1,202,649 | Bellinghausen | Oct. 24, 1916 |
| 1,233,760 | Dickinson | July 17, 1917 |
| 1,260,174 | Fisher | Mar. 19, 1918 |